(12) United States Patent
Menozzi et al.

(10) Patent No.: US 8,609,744 B2
(45) Date of Patent: Dec. 17, 2013

(54) OXYGEN-SCAVENGING MIXTURES

(75) Inventors: Edoardo Menozzi, Basel (CH); Enrico Galfré, Cuneo (IT); Yijun Ye, Solon, OH (US); Mauro Mazzini, Bologna (IT)

(73) Assignee: BASF SE, Ludwigshafen (DE)

( * ) Notice: Subject to any disclaimer, the term of this patent is extended or adjusted under 35 U.S.C. 154(b) by 176 days.

(21) Appl. No.: 12/990,797

(22) PCT Filed: Apr. 28, 2009

(86) PCT No.: PCT/EP2009/055124
§ 371 (c)(1),
(2), (4) Date: Jan. 13, 2011

(87) PCT Pub. No.: WO2009/135783
PCT Pub. Date: Nov. 12, 2009

(65) Prior Publication Data
US 2011/0105639 A1    May 5, 2011

(30) Foreign Application Priority Data

May 6, 2008  (EP) ................................. 08155727

(51) Int. Cl.
*C02F 1/70* (2006.01)
*C09K 15/02* (2006.01)
*C08K 3/32* (2006.01)

(52) U.S. Cl.
USPC ...... 523/100; 252/188.28; 252/397; 524/401; 524/414; 524/417

(58) Field of Classification Search
USPC .............. 523/100; 252/188.28, 397; 524/401, 524/414, 417
See application file for complete search history.

(56) References Cited

U.S. PATENT DOCUMENTS

| | | |
|---|---|---|
| 5,744,056 A | 4/1998 | Venkateshwaran |
| 5,885,481 A | 3/1999 | Venkateshwaran |
| 6,369,148 B2 | 4/2002 | Chiang |
| 6,586,514 B2 | 7/2003 | Chiang |
| 2002/0086929 A1* | 7/2002 | Chiang et al. .................. 524/417 |
| 2007/0098936 A1 | 5/2007 | Tung |
| 2009/0110857 A1 | 4/2009 | Ishizaki |

FOREIGN PATENT DOCUMENTS

| | | |
|---|---|---|
| JP | 2000109706 A | 4/2000 |
| WO | 96/40412 A | 12/1996 |
| WO | 2006/089895 A1 | 8/2006 |

OTHER PUBLICATIONS

Copending U.S. Appl. No. 12/747,195, filed Jun. 10, 2010.
Translation of JP2000109706, Apr. 12, 2013.

* cited by examiner

*Primary Examiner* — Michael Pepitone
(74) *Attorney, Agent, or Firm* — Tyler A. Stevenson

(57) ABSTRACT

An oxygen-scavenging mixture comprising: (I) an oxidizable metal component; (II) an electrolyte component selected from the group consisting of KCl and $CaCl_2$, and (III) a non-electrolytic, acidifying component.

19 Claims, No Drawings

OXYGEN-SCAVENGING MIXTURES

The present invention relates to an oxygen-scavenging mixture, a composition comprising a polymeric resin and said oxygen-scavenging mixture, an article containing said composition, a masterbatch containing said oxygen-scavenging mixture and the use of said oxygen-scavenging mixture in food packaging.

Oxygen-scavenging mixtures are for example described in U.S. Pat. Nos. 5,744,056, 5,885,481, 6,369,148 and 6,586,514.

The present invention relates in particular to an oxygen-scavenging mixture comprising
(I) an oxidizable metal component,
(II) an electrolyte component selected from the group consisting of KCl and $CaCl_2$, and
(III) a non-electrolytic, acidifying component.

The oxidizable metal is for example Al, Mg, Zn, Cu, Fe, Sn, Co or Mn, preferably Fe. Alloys or blends of such metals, or of such metals with other components, are also suitable. The metal particles can be of any shape, such as spherical, octahedral, cubic, in the form of rods or platelets and so on. They can be functionalized for better dispersion in the polymeric matrix or for optimal reactivity. However, preferred metal particles are not functionalized or stabilized by specific binding or interaction with polymeric, organic or organometallic compounds impermeable to oxygen transport.

The oxidizable metal particles are in particular particles whose larger dimension is 10 μm to 1,000 μm, preferably 10 μm to 300 μm and most preferably 10 μm to 50 μm in order to increase the quantity of oxygen able to react with each unit of metal.

The non-electrolytic, acidifying component includes various non-electrolytic organic and inorganic acids and their salts. Examples of particular compounds include anhydrous citric acid, citric acid monosodium salt, ammonium sulfate, magnesium sulfate, disodium dihydrogen pyrophosphate, also known as sodium acid pyrophosphate, sodium metaphosphate, sodium trimetaphosphate, sodium hexametaphosphate, citric acid disodium salt, ammonium phosphate, aluminum sulfate, nicotinic acid, aluminum ammonium sulfate, sodium phosphate monobasic and aluminum potassium sulfate. Combinations of such materials also can be used.

A particularly preferred non-electrolytic, acidifying component comprises as component (IIIa) an alkali metal acid pyrophosphate or an alkaline earth metal acid pyrophosphate and optionally in addition as component (IIIb) an alkali metal dihydrogenphosphate or an alkaline earth metal dihydrogenphosphate. Preferably, at least 1 part, in particular 1 to 10 parts, by weight of component (IIIb) per 100 parts by weight of component (IIIa) is used.

The components of the present oxygen-scavenging mixtures are present in proportions effective to provide oxygen-scavenging effects. Preferably, at least 1 part by weight of electrolyte component plus acidifying component is present per 100 parts by weight of oxidizable metal component, with the weight ratio of electrolyte component to non-electrolytic, acidifying component of e.g. 99:1 to 1:99, in particular 10:90 to 90:10. More preferably, at least about 10 parts of electrolyte plus non-electrolytic, acidifying components are present per 100 parts of oxidizable metal component to promote efficient usage of the latter for reaction with oxygen. In order to achieve an advantageous combination of oxidation efficiency, low cost and ease of processing and handling, 20 to 500, in particular 30 to 130 parts of electrolyte plus non-electrolytic, acidifying components per 100 parts of metal component are most preferred.

According to a preferred embodiment, the oxygen-scavenging mixture may additionally contain as component (IV) a water-absorbant binder to further enhance oxidation efficiency of the oxidizable metal. The binder can serve to provide additional moisture which enhances oxidation of the metal in the presence of the promoter compounds. Water-absorbing binders suitable for use generally include materials that absorb at least about 5 percent of their own weight in water and are chemically inert. Examples of suitable binders include diatomaceous earth, boehmite, kaolin clay, bentonite clay, acid clay, activated clay, zeolite, molecular sieves, talc, calcined vermiculite, activated carbon, graphite, carbon black, and the like. It is also contemplated to utilize organic binders, examples including various water absorbent polymers are disclosed in EP-A-428,736. Mixtures of such binders can also be employed. Preferred binders are bentonite clay, kaolin clay, and silica gel.

If present, the water-absorbent binder is preferably used in an amount of e.g. 5 to 100 parts per 100 parts of metal. When a binder component is used in compositions compounded into plastics, the binder most preferably is present in an amount of 10 to 50 parts per 100 parts of metal to enhance oxidation efficiency at loading levels low enough to ensure ease of processing.

A particularly preferred oxygen-scavenging mixture according to the present invention comprises
as component (I) iron,
as component (II) KCl or $CaCl_2$ and
as component (IIIa) $Na_2H_2P_2O_7$ or $CaH_2P_2O_7$;
and further optionally as component (IIIb) $NaH_2PO_4$, $KH_2PO_4$ or $Ca(H_2PO_4)_2$.

Another embodiment of the present invention relates to a composition comprising
(A) a polymeric resin, and
(B) an oxygen-scavenging mixture as defined above and optionally a conventional additive.

Examples of such polymeric resins are:
1. Polymers of monoolefins and diolefins, for example polypropylene, polyisobutylene, polybut-1-ene, poly-4-methylpent-1-ene, polyvinylcyclohexane, polyisoprene or polybutadiene, as well as polymers of cycloolefins, for instance of cyclopentene or norbornene, polyethylene (which optionally can be crosslinked), for example high density polyethylene (HDPE), high density and high molecular weight polyethylene (HDPE-HMW), high density and ultra-high molecular weight polyethylene (HDPE-UHMW), medium density polyethylene (MDPE), low density polyethylene (LDPE), linear low density polyethylene (LLDPE), (VLDPE) and (ULDPE).

Polyolefins, i.e. the polymers of monoolefins exemplified in the preceding paragraph, preferably polyethylene and polypropylene, can be prepared by different, and especially by the following, methods:
  a) radical polymerisation (normally under high pressure and at elevated temperature).
  b) catalytic polymerisation using a catalyst that normally contains one or more than one metal of groups IVb, Vb, VIb or VIII of the Periodic Table. These metals usually have one or more than one ligand, typically oxides, halides, alcoholates, esters, ethers, amines, alkyls, alkenyls and/or aryls that may be either π- or σ-coordinated. These metal complexes may be in the free form or fixed on substrates, typically on activated magnesium chloride, titanium(III) chloride, alumina or silicon oxide. These catalysts may be soluble or insoluble in the polymerisation medium. The catalysts can be used by themselves in the polymerisation or further activators may be used, typically metal alkyls, metal hydrides, metal alkyl halides, metal alkyl oxides or metal alkyloxanes, said metals being elements of groups Ia, IIa and/or IIIa of the Periodic Table. The activators may be modified conveniently with further ester, ether, amine or silyl ether groups. These catalyst systems are usually termed Phillips, Standard Oil Indiana, Ziegler (-Natta), TNZ (DuPont), metallocene or single site catalysts (SSC).

2. Mixtures of the polymers mentioned under 1), for example mixtures of polypropylene with polyisobutylene, polypropylene with polyethylene (for example PP/HDPE, PP/LDPE) and mixtures of different types of polyethylene (for example LDPE/HDPE).

3. Copolymers of monoolefins and diolefins with each other or with other vinyl monomers, for example ethylene/propylene copolymers, linear low density polyethylene (LLDPE) and mixtures thereof with low density polyethylene (LDPE), propylene/but-1-ene copolymers, propylene/isobutylene copolymers, ethylene/but-1-ene copolymers, ethylene/hexene copolymers, ethylene/methylpentene copolymers, ethylene/heptene copolymers, ethylene/octene copolymers, ethylene/vinylcyclohexane copolymers, ethylene/cycloolefin copolymers (e.g. ethylene/norbornene like COC), ethylene/1-olefins copolymers, where the 1-olefin is generated in-situ; propylene/butadiene copolymers, isobutylene/isoprene copolymers, ethylene/vinylcyclohexene copolymers, ethylene/alkyl acrylate copolymers, ethylene/alkyl methacrylate copolymers, ethylene/vinyl acetate copolymers or ethylene/acrylic acid copolymers and their salts (ionomers) as well as terpolymers of ethylene with propylene and a diene such as hexadiene, dicyclopentadiene or ethylidene-norbornene; and mixtures of such copolymers with one another and with polymers mentioned in 1) above, for example polypropylene/ethylene-propylene copolymers, LDPE/ethylene-vinyl acetate copolymers (EVA), LDPE/ethylene-acrylic acid copolymers (EAA), LLDPE/EVA, LLDPE/EAA and alternating or random polyalkylene/carbon monoxide copolymers and mixtures thereof with other polymers, for example polyamides.

4. Hydrocarbon resins (for example $C_5$-$C_9$) including hydrogenated modifications thereof (e.g. tackifiers) and mixtures of polyalkylenes and starch.

Homopolymers and copolymers from 1.)-4.) may have any stereostructure including syndiotactic, isotactic, hemi-isotactic or atactic; where atactic polymers are preferred. Stereoblock polymers are also included.

5. Polystyrene, poly(p-methylstyrene), poly($\alpha$-methylstyrene).

6. Aromatic homopolymers and copolymers derived from vinyl aromatic monomers including styrene, $\alpha$-methylstyrene, all isomers of vinyl toluene, especially p-vinyltoluene, all isomers of ethyl styrene, propyl styrene, vinyl biphenyl, vinyl naphthalene, and vinyl anthracene, and mixtures thereof. Homopolymers and copolymers may have any stereostructure including syndiotactic, isotactic, hemi-isotactic or atactic; where atactic polymers are preferred. Stereoblock polymers are also included.

6a. Copolymers including aforementioned vinyl aromatic monomers and comonomers selected from ethylene, propylene, dienes, nitriles, acids, maleic anhydrides, maleimides, vinyl acetate and vinyl chloride or acrylic derivatives and mixtures thereof, for example styrene/butadiene, styrene/acrylonitrile, styrene/ethylene (interpolymers), styrene/alkyl methacrylate, styrene/butadiene/alkyl acrylate, styrene/butadiene/alkyl methacrylate, styrene/maleic anhydride, styrene/acrylonitrile/methyl acrylate; mixtures of high impact strength of styrene copolymers and another polymer, for example a polyacrylate, a diene polymer or an ethylene/propylene/diene terpolymer; and block copolymers of styrene such as styrene/butadiene/styrene, styrene/isoprene/styrene, styrene/ethylene/butylene/styrene or styrene/ethylene/propylene/styrene.

6b. Hydrogenated aromatic polymers derived from hydrogenation of polymers mentioned under 6.), especially including polycyclohexylethylene (PCHE) prepared by hydrogenating atactic polystyrene, often referred to as polyvinylcyclohexane (PVCH).

6c. Hydrogenated aromatic polymers derived from hydrogenation of polymers mentioned under 6a.).

Homopolymers and copolymers may have any stereostructure including syndiotactic, isotactic, hemi-isotactic or atactic; where atactic polymers are preferred. Stereoblock polymers are also included.

7. Graft copolymers of vinyl aromatic monomers such as styrene or $\alpha$-methylstyrene, for example styrene on polybutadiene, styrene on polybutadiene-styrene or polybutadiene-acrylonitrile copolymers; styrene and acrylonitrile (or methacrylonitrile) on polybutadiene; styrene, acrylonitrile and methyl methacrylate on polybutadiene; styrene and maleic anhydride on polybutadiene; styrene, acrylonitrile and maleic anhydride or maleimide on polybutadiene; styrene and maleimide on polybutadiene; styrene and alkyl acrylates or methacrylates on polybutadiene; styrene and acrylonitrile on ethylene/propylene/diene terpolymers; styrene and acrylonitrile on polyalkyl acrylates or polyalkyl methacrylates, styrene and acrylonitrile on acrylate/butadiene copolymers, as well as mixtures thereof with the copolymers listed under 6), for example the copolymer mixtures known as ABS, MBS, ASA or AES polymers.

8. Halogen-containing polymers such as polychloroprene, chlorinated rubbers, chlorinated and brominated copolymer of isobutylene-isoprene (halobutyl rubber), chlorinated or sulfochlorinated polyethylene, copolymers of ethylene and chlorinated ethylene, epichlorohydrin homo- and copolymers, especially polymers of halogen-containing vinyl compounds, for example polyvinyl chloride, polyvinylidene chloride, polyvinyl fluoride, polyvinylidene fluoride, as well as copolymers thereof such as vinyl chloride/vinylidene chloride, vinyl chloride/vinyl acetate or vinylidene chloride/vinyl acetate copolymers.

9. Polymers derived from $\alpha,\beta$-unsaturated acids and derivatives thereof such as polyacrylates and polymethacrylates; polymethyl methacrylates, polyacrylamides and polyacrylonitriles, impact-modified with butyl acrylate.

10. Copolymers of the monomers mentioned under 9) with each other or with other unsaturated monomers, for example acrylonitrile/butadiene copolymers, acrylonitrile/alkyl acrylate copolymers, acrylonitrile/alkoxyalkyl acrylate or acrylonitrile/vinyl halide copolymers or acrylonitrile/alkyl methacrylate/butadiene terpolymers.

11. Polymers derived from unsaturated alcohols and amines or the acyl derivatives or acetals thereof, for example polyvinyl alcohol, polyvinyl acetate, polyvinyl stearate, polyvinyl benzoate, polyvinyl maleate, polyvinyl butyral, polyallyl phthalate or polyallyl melamine; as well as their copolymers with olefins mentioned in 1) above.

12. Homopolymers and copolymers of cyclic ethers such as polyalkylene glycols, polyethylene oxide, polypropylene oxide or copolymers thereof with bisglycidyl ethers.

13. Polyacetals such as polyoxymethylene and those polyoxymethylenes which contain ethylene oxide as a comonomer; polyacetals modified with thermoplastic polyurethanes, acrylates or MBS.

14. Polyphenylene oxides and sulfides, and mixtures of polyphenylene oxides with styrene polymers or polyamides.

15. Polyurethanes derived from hydroxyl-terminated polyethers, polyesters or polybutadienes on the one hand and aliphatic or aromatic polyisocyanates on the other, as well as precursors thereof.

16. Polyamides and copolyamides derived from diamines and dicarboxylic acids and/or from aminocarboxylic acids or the corresponding lactams, for example polyamide 4, polyamide 6, polyamide 6/6, 6/10, 6/9, 6/12, 4/6, 12/12, polyamide 11, polyamide 12, aromatic polyamides starting from m-xylene diamine and adipic acid; polyamides prepared from hexamethylenediamine and isophthalic or/and terephthalic acid and with or without an elastomer as modifier, for example poly-2,4,4,-trimethylhexamethylene terephthalamide or poly-m-phenylene isophthalamide; and also block copolymers of the aforementioned polyamides with polyolefins, olefin copolymers, ionomers or chemically bonded or grafted elastomers; or with polyethers, e.g. with polyethylene glycol, polypropylene glycol or polytetramethylene glycol; as well as polyamides or copolyamides modified with EPDM or ABS; and polyamides condensed during processing (RIM polyamide systems).

17. Polyureas, polyimides, polyamide-imides, polyetherimides, polyesterimides, polyhydantoins and polybenzimidazoles.

18. Polyesters derived from dicarboxylic acids and diols and/or from hydroxycarboxylic acids or the corresponding lactones or lactides, for example polyethylene terephthalate, polybutylene terephthalate, poly-1,4-dimethylolcyclohexane terephthalate, polyalkylene naphthalate and polyhydroxybenzoates as well as copolyether esters derived from hydroxyl-terminated polyethers, and also polyesters modified with polycarbonates or MBS. Copolyesters may comprise, for example—but are not limited to—polybutylenesuccinate/terephtalate, polybutyleneadipate/terephthalate, polytetramethyleneadipate/terephthalate, polybutylensuccinate/adipate, polybutylensuccinate/carbonate, poly-3-hydroxybutyrate/octanoate copolymer, poly-3-hydroxybutyrate/hexanoate/decanoate terpolymer. Furthermore, aliphatic polyesters may comprise, for example—but are not limited to—the class of poly(hydroxyalkanoates), in particular, poly(propiolactone), poly(butyrolactone), poly(pivalolactone), poly(valerolactone) and poly(caprolactone), polyethylenesuccinate, polypropylenesuccinate, polybutylenesuccinate, polyhexamethylenesuccinate, polyethyleneadipate, polypropyleneadipate, polybutyleneadipate, polyhexamethyleneadipate, polyethyleneoxalate, polypropyleneoxalate, polybutyleneoxalate, polyhexamethyleneoxalate, polyethylenesebacate, polypropylenesebacate, polybutylenesebacate and polylactic acid (PLA) as well as corresponding polyesters modified with polycarbonates or MBS. The term "polylactic acid (PLA)" designates a homopolymer of preferably poly-L-lactide and any of its blends or alloys with other polymers; a co-polymer of lactic acid or lactide with other monomers, such as hydroxy-carboxylic acids, like for example glycolic acid, 3-hydroxy-butyric acid, 4-hydroxy-butyric acid, 4-hydroxy-valeric acid, 5-hydroxy-valeric acid, 6-hydroxy-caproic acid and cyclic forms thereof; the terms "lactic acid" or "lactide" include L-lactic acid, D-lactic acid, mixtures and dimers thereof, i.e. L-lactide, D-lactide, meso-lacide and any mixtures thereof.

19. Polycarbonates and polyester carbonates.

20. Polyketones.

21. Polysulfones, polyether sulfones and polyether ketones.

22. Crosslinked polymers derived from aldehydes on the one hand and phenols, ureas and melamines on the other hand, such as phenol/formaldehyde resins, urea/formaldehyde resins and melamine/formaldehyde resins.

23. Drying and non-drying alkyd resins.

24. Unsaturated polyester resins derived from copolyesters of saturated and unsaturated dicarboxylic acids with polyhydric alcohols and vinyl compounds as crosslinking agents, and also halogen-containing modifications thereof of low flammability.

25. Crosslinkable acrylic resins derived from substituted acrylates, for example epoxy acrylates, urethane acrylates or polyester acrylates.

26. Alkyd resins, polyester resins and acrylate resins crosslinked with melamine resins, urea resins, isocyanates, isocyanurates, polyisocyanates or epoxy resins.

27. Crosslinked epoxy resins derived from aliphatic, cycloaliphatic, heterocyclic or aromatic glycidyl compounds, e.g. products of diglycidyl ethers of bisphenol A and bisphenol F, which are crosslinked with customary hardeners such as anhydrides or amines, with or without accelerators.

28. Natural polymers such as cellulose, rubber, gelatin and chemically modified homologous derivatives thereof, for example cellulose acetates, cellulose propionates and cellulose butyrates, or the cellulose ethers such as methyl cellulose; as well as rosins and their derivatives.

29. Blends of the aforementioned polymers (polyblends), for example PP/EPDM, Polyamide/EPDM or ABS, PVC/EVA, PVC/ABS, PVC/MBS, PC/ABS, PBTP/ABS, PC/ASA, PC/PBT, PVC/CPE, PVC/acrylates, POM/thermoplastic PUR, PC/thermoplastic PUR, POM/acrylate, POM/MBS, PPO/HIPS, PPO/PA 6.6 and copolymers, PA/HDPE, PA/PP, PA/PPO, PBT/PC/ABS or PBT/PET/PC.

30. Naturally occurring and synthetic organic materials which are pure monomeric compounds or mixtures of such compounds, for example mineral oils, animal and vegetable fats, oil and waxes, or oils, fats and waxes based on synthetic esters (e.g. phthalates, adipates, phosphates or trimellitates) and also mixtures of synthetic esters with mineral oils in any weight ratios, typically those used as spinning compositions, as well as aqueous emulsions of such materials.

31. Aqueous emulsions of natural or synthetic rubber, e.g. natural latex or latices of carboxylated styrene/butadiene copolymers.

According to a preferred embodiment of the present invention, the polymeric resin is an olefin homo- or copolymer, a polyamide homo or copolymer, a polyester with repeating units selected from the group consisting of therephthalic acid residues, isophtalic acid residues, naphthalenic acid residues and mixtures therof.

Any suitable polymeric resin of the above list into which an effective amount of the oxygen-scavenging mixture of this invention can be incorporated and that can be formed into a laminar configuration, such as film, sheet or a wall structure, can be used as the plastic resin in the compositions according to this aspect of the invention. Thermoplastic and thermoset resins can be preferably used. Examples of thermoplastic polymers include polyamides, such as nylon 6, nylon 66 and nylon 612, linear polyesters, such as polyethylene terephthalate, polybutylene terephthalate and polyethylene naphthalate, branched polyesters, polystyrenes, polycarbonate, polymers of unsubstituted, substituted or functionalized olefins such as polyvinyl chloride, polyvinylidene dichloride, polyacrylamide, polyacrylonitrile, polyvinyl acetate, polyacrylic acid, polyvinyl methyl ether, ethylene vinyl acetate copolymer, ethylene methyl acrylate copolymer, polyethylene, polypropylene, ethylene-propylene copolymers, poly(1-hexene), poly(4-methyl-1-pentene), poly(1-butene), poly(3-methyl-1-butene), poly(3-phenyl-1-propene) and poly(vinylcyclohexane). Homopolymers and copolymers are suitable as are polymer blends containing one or more of such materials. Thermosetting resins, such as epoxies, oleoresins, unsaturated polyester resins and phenolics also are suitable.

Preferred polymers are in particular thermoplastic resins having oxygen permeation coefficients greater than $2\times10^{-12}$ $cm^3\ cm\ cm^{-2}\ sec^{-1}\ cm^{-1}$ Hg as measured at a temperature of 20° C. and a relative humidity of 0% because such resins are relatively inexpensive, easily formed into packaging structures and, when used with the invented oxygen-scavenging mixture, can provide a high degree of active barrier protection to oxygen-sensitive products. Examples of these include polyethylene terephthalate and polyalpha-olefin resins such as high, low and linear low density polyethylene and polypropylene. Even relatively low levels of oxygen-scavenging mixture, e.g. 5 to 15 parts per 100 parts resin, can provide a high degree of oxygen barrier protection to such resins. Among these preferred resins, permeability to oxygen increases in the order polyethylene terephthalate, polypropylene, high density polyethylene, linear low density polyethylene and low density polyethylene, other things being equal. Accordingly, for such polymeric resins, oxygen scavenger loadings for achieving a given level of oxygen barrier effectiveness increase in like order, other things being equal.

In selecting a thermoplastic resin for use or compounding with the oxygen-scavenging mixture of the invention, the presence of residual antioxidant compounds in the resin can be detrimental to oxygen absorption effectiveness. Phenol-type antioxidants and phosphite-type antioxidants are commonly used by polymer manufacturers for the purpose of enhancing thermal stability of resins and fabricated products obtained therefrom. Specific examples of these residual antioxidant compounds include materials such as butylated hydroxytoluene, tetrakis(methylene(3,5-di-t-butyl-4-hydroxyhydro-cinnamate)methane and triisooctyl phosphite. Such antioxidants are not to be confused with the oxygen-scavenger components utilized in the present invention. Generally, oxygen absorption of the scavenger compositions of the present invention is improved as the level of residual antioxidant compounds is reduced. Thus, commercially available resins containing low levels of phenol-type or phosphite-type antioxidants, preferably less than about 1600 ppm, and most preferably less than about 800 ppm, by weight of the resin, are preferred (although not required) for use in the present invention. Examples are Dow Chemical Dowlex 2032 (RTM) linear low density polyethylene (LLDPE); Union Carbide GRSN 7047 (RTM) LLDPE; Goodyear PET "Traytuf" 9506 m (RTM); and Eastman PETG 6763 (RTM). Measurement of the amount of residual antioxidant can be performed using high pressure liquid chromatography.

If desired, in addition one or more of the following conventional additives might be used in combination with the oxygen scavenger formulation; the list includes for example antioxidants, UV absorbers and/or further light stabilizers such as e.g.:

1. Alkylated monophenols, for example 2,6-di-tert-butyl-4-methylphenol, 2-tert-butyl-4,6-di-methylphenol, 2,6-di-tert-butyl-4-ethylphenol, 2,6-di-tert-butyl-4-n-butylphenol, 2,6-di-tert-butyl-4-isobutylphenol, 2,6-dicyclopentyl-4-methylphenol, 2-(α-methylcyclohexyl)-4,6-dimethylphenol, 2,6-dioctadecyl-4-methylphenol, 2,4,6-tricyclohexylphenol, 2,6-di-tert-butyl-4-meth-oxymethylphenol, nonylphenols which are linear or branched in the side chains, for example, 2,6-di-nonyl-4-methylphenol, 2,4-dimethyl-6-(1'-methylundec-1'-yl)phenol, 2,4-dimethyl-6-(1'-methylheptadec-1'-yl)phenol, 2,4-dimethyl-6-(1'-methyltridec-1'-yl)phenol and mixtures thereof.

2. Alkylthiomethylphenols, for example 2,4-dioctylthiomethyl-6-tert-butylphenol, 2,4-dioctylthiomethyl-6-methylphenol, 2,4-dioctylthiomethyl-6-ethylphenol, 2,6-di-dodecylthiomethyl-4-nonylphenol.

3. Hydroquinones and alkylated hydroquinones, for example 2,6-di-tert-butyl-4-methoxy-phenol, 2,5-di-tert-butylhydroquinone, 2,5-di-tert-amylhydroquinone, 2,6-diphenyl-4-octade-cyloxyphenol, 2,6-di-tert-butylhydroquinone, 2,5-di-tert-butyl-4-hydroxyanisole, 3,5-di-tert-butyl-4-hydroxyanisole, 3,5-di-tert-butyl-4-hydroxyphenyl stearate, bis (3,5-di-tert-butyl-4-hydroxyphenyl) adipate.

4. Tocopherols, for example α-tocopherol, β-tocopherol, γ-tocopherol, δ-tocopherol and mixtures thereof (vitamin E).

5. Hydroxylated thiodiphenyl ethers, for example 2,2'-thiobis(6-tert-butyl-4-methylphenol), 2,2'-thiobis(4-octylphenol), 4,4'-thiobis(6-tert-butyl-3-methylphenol), 4,4'-thiobis(6-tert-butyl-2-methylphenol), 4,4'-thiobis(3,6-di-sec-amylphenol), 4,4'-bis(2,6-dimethyl-4-hydroxyphenyl)-disulfide.

6. Alkylidenebisphenols, for example 2,2'-methylenebis (6-tert-butyl-4-methylphenol), 2,2'-methylenebis(6-tert-butyl-4-ethylphenol), 2,2'-methylenebis[4-methyl-6-(α-methylcyclohexyl)-phenol], 2,2'-methylenebis(4-methyl-6-cyclohexylphenol), 2,2'-methylenebis(6-nonyl-4-methylphenol), 2,2'-methylenebis(4,6-di-tert-butylphenol), 2,2'-ethylidenebis(4,6-di-tert-butyl-phenol), 2,2'-ethylidenebis(6-tert-butyl-4-isobutylphenol), 2,2'-methylenebis[6-(α-methylbenzyl)-4-nonylphenol], 2,2'-methylenebis[6-(α,α-dimethylbenzyl)-4-nonylphenol], 4,4'-methylenebis(2,6-di-tert-butylphenol), 4,4'-methylenebis(6-tert-butyl-2-methylphenol), 1,1-bis(5-tertbutyl-4-hydroxy-2-methylphenyl)butane, 2,6-bis(3-tert-butyl-5-methyl-2-hydroxybenzyl)-4-methylphenol, 1,1,3-tris(5-tert-butyl-4-hydroxy-2-methylphenyl)butane, 1,1-bis(5-tert-butyl-4-hydroxy-2-methyl-phenyl)-3-n-dodecylmercaptobutane, ethylene glycol bis[3,3-bis(3'-tert-butyl-4'-hydroxyphenyl) butyrate], bis(3-tert-butyl-4-hydroxy-5-methyl-phenyl)dicyclopentadiene, bis[2-(3'-tert-butyl-2'-hydroxy-5'-methylbenzyl)-6-tert-butyl-4-methylphenyl]terephthalate, 1,1-bis-(3,5-dimethyl-2-hydroxyphenyl)butane, 2,2-bis(3,5-di-tert-butyl-4-hydroxyphenyl)propane, 2,2-bis(5-tert-butyl-4-hydroxy-2-methylphenyl)-4-n-dodecylmercaptobutane, 1,1,5,5-tetra-(5-tert-butyl-4-hydroxy-2-methylphenyl)pentane.

7. O-, N- and S-benzyl compounds, for example 3,5,3',5'-tetra-tert-butyl-4,4'-dihydroxydibenzyl ether, octadecyl-4-hydroxy-3,5-dimethylbenzylmercaptoacetate, tridecyl-4-hydroxy-3,5-di-tert-butylbenzylmercaptoacetate, tris(3,5-di-tert-butyl-4-hydroxybenzyl)amine, bis(4-tert-butyl-3-hydroxy-2,6-dimethylbenzyl)dithioterephthalate, bis(3,5-di-tert-butyl-4-hydroxy-benzyl)sulfide, isooctyl-3,5-di-tert-butyl-4-hydroxybenzylmercaptoacetate.

8. Hydroxybenzylated malonates, for example dioctadecyl-2,2-bis(3,5-di-tert-butyl-2-hydroxybenzyl)malonate, di-octadecyl-2-(3-tert-butyl-4-hydroxy-5-methylbenzyl)malonate, di-dodecylmercaptoethyl-2,2-bis(3,5-di-tert-butyl-4-hydroxybenzyl)malonate, bis[4-(1,1,3,3-tetramethylbutyl) phenyl]-2,2-bis(3,5-di-tert-butyl-4-hydroxybenzyl) malonate.

9. Aromatic hydroxybenzyl compounds, for example 1,3,5-tris(3,5-di-tert-butyl-4-hydroxy-benzyl)-2,4,6-trimethyl-benzene, 1,4-bis(3,5-di-tert-butyl-4-hydroxybenzyl)-2,3,5,6-tetramethylbenzene, 2,4,6-tris(3,5-di-tert-butyl-4-hydroxybenzyl)phenol.

10. Triazine compounds, for example 2,4-bis(octylmercapto)-6-(3,5-di-tert-butyl-4-hydroxy-anilino)-1,3,5-triazine, 2-octylmercapto-4,6-bis(3,5-di-tert-butyl-4-hydroxyanilino)-1,3,5-triazine, 2-octylmercapto-4,6-bis(3,5-di-tert-butyl-4-hydroxyphenoxy)-1,3,5-triazine, 2,4,6-tris(3,5-di-tert-butyl-4-hydroxyphenoxy)-1,2,3-triazine, 1,3,5-tris(3,5-di-tert-butyl-4-hydroxybenzyl)isocyanurate, 1,3,5-tris(4-tert-butyl-3-hydroxy-2,6-dimethylbenzyl)isocyanurate, 2,4,6-tris(3,5-di-tert-butyl-4-hydroxyphenylethyl)-1,3,5-triazine, 1,3,5-tris(3,5-di-tert-butyl-4-hydroxyphenylpropionyl)-hexahydro-1,3,5-triazine, 1,3,5-tris(3,5-dicyclohexyl-4-hydroxybenzyl)isocyanurate.

11. Benzylphosphonates, for example dimethyl-2,5-di-tert-butyl-4-hydroxybenzylphosphonate, diethyl-3,5-di-tert-butyl-4-hydroxybenzylphosphonate, dioctadecyl3,5-di-tert-butyl-4-hydroxybenzylphosphonate, dioctadecyl-5-tert-butyl-4-hydroxy-3-methylbenzylphosphonate, the calcium salt of the monoethyl ester of 3,5-di-tert-butyl-4-hydroxybenzylphosphonic acid.

12. Acylaminophenols, for example 4-hydroxylauranilide, 4-hydroxystearanilide, octyl N-(3,5-di-tert-butyl-4-hydroxyphenyl)carbamate.

13. Esters of β3-(3,5-di-tert-butyl-4-hydroxyphenyl)propionic acid with mono- or polyhydric alcohols, e.g. with methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl) isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

14. Esters of β3-(5-tert-butyl-4-hydroxy-3-methylphenyl) propionic acid with mono- or polyhydric alcohols, e.g. with methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl) isocyanurate, N,N'-bis-(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane; 3,9-bis[2-{3-(3-tertbutyl-4-hydroxy-5-methylphenyl)propionyloxy}-1,1-dimethylethyl]-2,4,8,10-tetraoxaspiro[5.5]-undecane.

15. Esters of β-(3,5-dicyclohexyl-4-hydroxyphenyl)propionic acid with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

16. Esters of 3,5-di-tert-butyl-4-hydroxyphenyl acetic acid with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

17. Amides of β-(3,5-di-tert-butyl-4-hydroxyphenyl)propionic acid e.g. N,N'-bis(3,5-di-tert-butyl-4-hydroxyphenylpropionyl)hexamethylenediamide, N,N'-bis(3,5-di-tert-butyl-4-hydroxy-phenylpropionyl)trimethylenediamide, N,N'-bis(3,5-di-tert-butyl-4-hydroxyphenylpropionyl)hydrazide, N,N'-bis[2-(3-[3,5-di-tert-butyl-4-hydroxyphenyl]propionyloxy)ethyl]oxamide (Naugard®XL-1, supplied by Uniroyal).

18. Ascorbic acid (vitamin C)

19. Aminic antioxidants, for example N,N'-di-isopropyl-p-phenylenediamine, N,N'-di-sec-butyl-p-phenylenediamine, N,N'-bis(1,4-dimethylpentyl)-p-phenylenediamine, N,N'-bis(1-ethyl-3-methylpentyl)-p-phenylenediamine, N,N'-bis(1-methylheptyl)-p-phenylenediamine, N,N'-dicyclohexyl-p-phenylenediamine, N,N'-diphenyl-p-phenylenediamine, N,N'-bis(2-naphthyl)-p-phenylenediamine, N-isopropyl-N'-phenyl-p-phenylenediamine, N-(1,3-dimethylbutyl)-N'-phenyl-p-phenylenediamine, N-(1-methylheptyl)-N'-phenyl-p-phenylenediamine, N-cyclohexyl-N'-phenyl-p-phenylenediamine, 4-(p-toluenesulfamoyl)diphenylamine, N,N'-dimethyl-N,N'-di-sec-butyl-p-phenylenediamine, diphenylamine, N-allyldiphenylamine, 4-isopropoxydiphenylamine, N-phenyl-1-naphthylamine, N-(4-tert-octylphenyl)-1-naphthylamine, N-phenyl-2-naphthylamine, octylated diphenylamine, for example p,p'-di-tert-octyldiphenylamine, 4-n-butyl-aminophenol, 4-butyrylaminophenol, 4-nonanoylaminophenol, 4-dodecanoylaminophenol, 4-octadecanoylaminophenol, bis(4-methoxyphenyl)amine, 2,6-di-tert-butyl-4-dimethylaminomethylphenol, 2,4'-diaminodiphenylmethane, 4,4'-diaminodiphenylmethane, N,N,N',N'-tetramethyl-4,4'-diaminodiphenylmethane, 1,2-bis[(2-methylphenyl)amino]ethane, 1,2-bis(phenyl-amino)propane, (o-tolyl)biguanide, bis[4-(1',3'-dimethylbutyl)phenyl]amine, tert-octylated N-phenyl-1-naphthylamine, a mixture of mono- and dialkylated tert-butyl/tert-octyldiphenylamines, a mixture of mono- and dialkylated nonyldiphenylamines, a mixture of mono- and dialkylated dodecyldiphenylamines, a mixture of mono- and dialkylated isopropyl/isohexyldiphenylamines, a mixture of mono- and dialkylated tert-butyldiphenylamines, 2,3-dihydro-3,3-dimethyl-4H-1,4-benzothiazine, phenothiazine, a mixture of mono- and dialkylated tert-butyl/tert-octylphenothiazines, a mixture of mono- and dialkylated tert-octylphenothiazines, N-allylphenothiazine, N,N,N',N'-tetraphenyl-1,4-diaminobut-2-ene.

20. 2-(2'-Hydroxyphenyl)benzotriazoles, for example 2-(2'-hydroxy-5'-methylphenyl)-benzotriazole, 2-(3',5'-di-tert-butyl-2'-hydroxyphenyl)benzotriazole, 2-(5'-tert-butyl-2'-hydroxyphenyl)benzotriazole, 2-(2'-hydroxy-5'-(1,1,3,3-tetramethylbutyl)phenyl)benzotriazole, 2-(3',5-di-tert-butyl-2'-hydroxyphenyl)-5-chloro-benzotriazole, 2-(3'-tert-butyl-2'-hydroxy-5'-methylphenyl)-5-chloro-benzotriazole, 2-(3'-sec-butyl-5'-tert-butyl-2'-hydroxyphenyl)benzotriazole, 2-(2'-hydroxy-4'-octyloxyphenyl)benzotriazole, 2-(3',5'-di-tert-amyl-2'-hydroxyphenyl)benzotriazole, 2-(3',5'-bis-(α,α-dimethylbenzyl)-2'-hydroxyphenyl)benzotriazole, 2-(3'-tert-butyl-2'-hydroxy-5'-(2-octyloxycarbonylethyl)phenyl)-5-chloro-benzotriazole, 2-(3'-tert-butyl-5'-[2-(2-ethylhexyloxy)-carbonylethyl]-2'-hydroxyphenyl)-5-chloro-benzotriazole, 2-(3'-tert-butyl-2'-hydroxy-5'-(2methoxycarbonylethyl)phenyl)-5-chloro-benzotriazole, 2-(3'-tert-butyl-2'-hydroxy-5'-(2-methoxycarbonylethyl)phenyl)benzotriazole, 2-(3'-tert-butyl-2'-hydroxy-5'-(2-octyloxycarbonylethyl)phenyl)benzotriazole, 2-(3'-tert-butyl-5'-[2-(2-ethylhexyloxy)carbonylethyl]-2'-hydroxyphenyl) benzotriazole, 2-(3'-dodecyl-2'-hydroxy-5'-methylphenyl) benzotriazole, 2-(3'-tert-butyl-2'-hydroxy-5'-(2-isooctyloxycarbonylethyl)phenylbenzotriazole, 2,2'-methylene-bis[4-(1,1,3,3-tetramethylbutyl)-6-benzotriazole-2-ylphenol]; the transesterification product of 2[-3'-tert-butyl-5'-(2-methoxycarbonylethyl)-2'-hydroxyphenyl]-2H-benzotriazole with polyethylene glycol 300;

where R=3'-tert-butyl-4'-hydroxy-5'-2H-benzotriazol-2-ylphenyl, 2-[2'-hydroxy-3'-(α,α-dimethylbenzyl)-5'-(1,1,3,3-tetramethylbutyl)-phenyl]-benzotriazole; 2-[2'-hydroxy-3'-(1,1,3,3-tetramethylbutyl)-5'-(α,α-dimethylbenzyl)-phenyl]benzotriazole.

21. 2-Hydroxybenzophenones, for example the 4-hydroxy, 4-methoxy, 4-octyloxy, 4-decyloxy, 4-dodecyloxy, 4-benzyloxy, 4,2',4'-trihydroxy and 2'-hydroxy-4,4'-dimethoxy derivatives.

22. Esters of substituted and unsubstituted benzoic acids, for example 4-tert-butyl-phenyl salicylate, phenyl salicylate, octylphenyl salicylate, dibenzoyl resorcinol, bis(4-tert-butylbenzoyl)resorcinol, benzoyl resorcinol, 2,4-di-tert-butylphenyl 3,5-di-tert-butyl-4-hydroxybenzoate, hexadecyl 3,5-di-tert-butyl-4-hydroxybenzoate, octadecyl 3,5-di-tert-butyl-4-hydroxybenzoate, 2-methyl-4,6-di-tert-butylphenyl 3,5-di-tert-butyl-4-hydroxybenzoate.

23. Acrylates, for example ethyl α-cyano-β,β-diphenylacrylate, isooctyl α-cyano-β,β-diphenylacrylate, methyl α-carbomethoxycinnamate, methyl α-cyano-β-methyl-p-methoxycinnamate, butyl α-cyano-β-methyl-p-methoxycinnamate, methyl α-carbomethoxy-p-methoxycinnamate, N-(β-carbomethoxy-β-cyanovinyl)-2-methylindoline, neopentyl tetra(α-cyano-β,β-di-phenylacrylate.

24. Sterically hindered amines, for example carbonic acid bis(1-undecyloxy-2,2,6,6-tetramethyl-4-piperidyl)ester, bis (2,2,6,6-tetramethyl-4-piperidyl)sebacate, bis(2,2,6,6-tetramethyl-4-piperidyl)succinate, bis(1,2,2,6,6-pentamethyl-4-piperidyl)sebacate, bis(1-octyloxy-2,2,6,6-tetramethyl-4-piperidyl)sebacate, bis(1,2,2,6,6-pentamethyl-4-piperidyl) n-butyl-3,5-di-tert-butyl-4-hydroxybenzylmalonate, the condensate of 1-(2-hydroxyethyl)-2,2,6,6-tetramethyl-4-hydroxypiperidine and succinic acid, linear or cyclic condensates of N,N'-bis(2,2,6,6-tetramethyl-4-piperidyl) hexamethylenediamine and 4-tert-octylamino-2,6-di-chloro-1,3,5-triazine, tris(2,2,6,6-tetramethyl-4-piperidyl) nitrilotriacetate, tetrakis(2,2,6,6-tetramethyl-4-piperidyl)-1,2,3,4-butanetetracarboxylate, 1,1'-(1,2-ethanediyl)-bis(3,3,5,5-tetramethylpiperazinone), 4-benzoyl-2,2,6,6-tetramethylpiperidine, 4-stearyloxy-2,2,6,6-tetramethylpiperidine, bis(1,2,2,6,6-pentamethylpiperidyl)-2-n-butyl-2-(2-hydroxy-3,5-di-tert-butylbenzyl)-malonate, 3-n-octyl-7,7,9,9-tetramethyl-1,3,8-triazaspiro[4.5]decane-2,4-dione, bis(1-octyloxy-2,2,6,6-tetramethylpiperidyl)sebacate, bis(1-octyloxy-2,2,6,6-tetramethylpiperidyl)succinate, linear or cyclic condensates of N,N'-bis(2,2,6,6-tetramethyl-4-piperidyl)hexamethylenediamine and 4-morpholino-2,6-dichloro-1,3,5-triazine, the condensate of 2-chloro-4,6-bis(4-n-butylamino-2,2,6,6-tetramethylpiperidyl)-1,3,5-triazine and 1,2-bis(3-aminopropylamino)-ethane, the condensate of 2-chloro-4,6-di-(4-n-butylamino-1,2,2,6,6-pentamethylpiperidyl)-1,3,5-triazine and 1,2-bis(3-aminopropylamino) ethane, 8-acetyl-3-dodecyl-7,7,9,9-tetramethyl-1,3,8-triazaspiro[4.5]decane-2,4-dione, 3-dodecyl-1-(2,2,6,6-tetramethyl-4-piperidyl)pyrrolidine-2,5-dione, 3-dodecyl-1-(1,2,2,6,6-pentamethyl-4-piperidyl)pyrrolidine-2,5-dione, a mixture of 4-hexadecyloxy- and 4-stearyloxy-2,2,6,6-tetramethylpiperidine, a condensate of N,N'-bis(2,2,6,6-tetramethyl-4-piperidyl)hexamethylenediamine and 4-cyclohexylamino-2,6-dichloro-1,3,5-triazine, a condensate of 1,2-bis (3-aminopropylamino)ethane and 2,4,6-trichloro-1,3,5-triazine as well as 4-butylamino-2,2,6,6-tetramethylpiperidine (CAS Reg. No. [136504-96-6]); a condensate of 1,6-hexanediamine and 2,4,6-trichloro-1,3,5-triazine as well as N,N-dibutylamine and 4-butylamino-2,2,6,6-tetramethylpiperidine (CAS Reg. No. [192268-64-7]); N-(2,2,6,6-tetramethyl-4-piperidyl)-n-dodecylsuccinimide, N-(1,2,2,6,6-pentamethyl-4-piperidyl)-n-dodecylsuccinimide, 2-undecyl-7,7,9,9-tetramethyl-1-oxa-3,8-diaza-4-oxospiro-[4,5]decane, a reaction product of 7,7,9,9-tetramethyl-2-cycloundecyl-1-oxa-3,8-diaza-4-oxo-spiro-[4,5]decane and epichlorohydrin, 1,1-bis(1,2,2,6,6-pentamethyl-4-piperidyloxycarbonyl)-2-(4-methoxyphenyl)ethene, N,N'-bis-formyl-N,N'-bis(2,2,6,6-tetramethyl-4-piperidyl)hexamethylenediamine, a diester of 4-methoxymethylenemalonic acid with 1,2,2,6,6-pentamethyl-4-hydroxypiperidine, poly[methylpropyl-3-oxy-4-(2,2,6,6-tetramethyl-4-piperidyl)]siloxane, a reaction product of maleic acid anhydride-α-olefin copolymer with 2,2,6,6-tetramethyl-4-aminopiperidine or 1,2,2,6,6-pentamethyl-4-aminopiperidine, 2,4-bis[N-(1-cyclohexyloxy-2,2,6,6-tetramethylpiperidine-4-yl)-N-butylamino]-6-(2-hydroxyethyl)amino-1,3,5-triazine, 1-(2-hydroxy-2-methylpropoxy)-4-octadecanoyloxy-2,2,6,6-tetramethylpiperidine, 5-(2-ethylhexanoyl)oxymethyl-3,3,5-trimethyl-2-morpholinone, Sanduvor (Clariant; CAS Reg. No. 106917-31-1], 5-(2-ethylhexanoyl)oxymethyl-3,3,5-trimethyl-2-morpholinone, the reaction product of 2,4-bis[(1-cyclohexyloxy-2,2,6,6-piperidine-4-yl)butylamino]-6-chloro-s-triazine with N,N'-bis(3-aminopropyl) ethylenediamine), 1,3,5-tris(N-cyclohexyl-N-(2,2,6,6-tetramethylpiperazine-3-one-4-yl)amino)-s-triazine, 1,3,5-tris(N-cyclohexyl-N-(1,2,2,6,6-pentamethylpiperazine-3-one-4-yl)-amino)-s-triazine.

25. Oxamides, for example 4,4'-dioctyloxyoxanilide, 2,2'-diethoxyoxanilide, 2,2'-dioctyloxy-5,5'-di-tert-butoxanilide, 2,2'-didodecyloxy-5,5'-di-tert-butoxanilide, 2-ethoxy-2'-ethyloxanilide, N,N'-bis(3-dimethylaminopropyl)oxamide, 2-ethoxy-5-tert-butyl-2'-ethoxanilide and its mixture with 2-ethoxy-2'-ethyl-5,4'-di-tert-butoxanilide, mixtures of o- and p-methoxy-disubstituted oxanilides and mixtures of o- and p-ethoxy-disubstituted oxanilides.

26. 2-(2-Hydroxyphenyl)-1,3,5-triazines, for example 2,4,6-tris(2-hydroxy-4-octyloxyphenyl)-1,3,5-triazine, 2-(2-hydroxy-4-octyloxyphenyl)-4,6-bis(2,4-dimethylphenyl)-1,3,5-triazine, 2-(2,4-dihydroxyphenyl)-4,6-bis(2,4-dimethylphenyl)-1,3,5-triazine, 2,4-bis(2-hydroxy-4-propyloxyphenyl)-6-(2,4-dimethylphenyl)-1,3,5-triazine, 2-(2-hydroxy-4-octyloxyphenyl)-4,6-bis(4-methylphenyl)-1,3,5-triazine, 2-(2-hydroxy-4-dodecyloxyphenyl)-4,6-bis(2,4-dimethylphenyl)-1,3,5-triazine, 2-(2-hydroxy-4-tridecyloxyphenyl)-4,6-bis(2,4-dimethylphenyl)-1,3,5-triazine, 2-[2-hydroxy-4-(2-hydroxy-3-butyloxypropoxy)phenyl]-4,6-bis(2,4-dimethyl)-1,3,5-triazine, 2-[2-hydroxy-4-(2-hydroxy-3-octyloxypropyloxy)phenyl]-4,6-bis(2,4-dimethyl)-1,3,5-triazine, 2-[4-(dodecyloxy/tridecyloxy-2-hydroxypropoxy)-2-hydroxyphenyl]-4,6-bis(2,4-dimethylphenyl)-1,3,5-triazine, 2-[2-hydroxy-4-(2-hydroxy-3-dodecyloxypropoxy)phenyl]-4,6-bis(2,4-dimethylphenyl)-1,3,5-triazine, 2-(2-hydroxy-4-hexyloxy)phenyl-4,6-diphenyl-1,3,5-triazine, 2-(2-hydroxy-4-methoxyphenyl)-4,6-diphenyl-1,3,5-triazine, 2,4,6-tris[2-hydroxy-4-(3-butoxy-2-hydroxypropoxy)phenyl]-1,3,5-triazine, 2-(2-hydroxyphenyl)-4-(4-methoxyphenyl)-6-phenyl-1,3,5-triazine, 2-{hydroxy-4-[3-(2-ethylhexyl-1-oxy)-2-hydroxypropyloxy]phenyl}-4,6-bis(2,4-dimethylphenyl)-1,3,5-triazine, 2,4-bis(4-[2-ethylhexyloxy]-2-hydroxyphenyl)-6-(4-methoxyphenyl)-1,3,5-triazine.

When used in combination with resins, the electrolyte and non-electrolytic, acidifying components of the invented oxygen-scavenging mixtures, and any optional water-absorbent binder that may be used, are e.g. used in particulate or powder form. Particle sizes of at least 290 μm or smaller are preferred to facilitate melt-processing of oxygen-scavenger thermoplastic resin formulations. For use with thermoset resins for formation of coatings, particle sizes smaller than the thickness of the final coating are advantageously employed. The oxygen-scavenger mixture can be used directly in powder or particulate form, or it can be processed, for example by melt compounding or compaction-sintering, into pellets to facilitate further handling and use. The mixture of the oxidizable metal component, electrolyte component, non-electrolytic, acidifying component and optional water-absorbent binder can be added directly to a thermoplastic polymer compounding or melt-fabrication operation, such as in the extrusion section thereof, after which the molten mixture can be advanced directly to a film or sheet extrusion or coextrusion line to obtain monolayer or multilayer film or sheet in which the amount of oxygen-scavenging mixture is determined by the proportions in which the mixture and resin are combined in the resin feed section of the extrusion-fabrication line. Alternatively, the mixture of the oxidizable metal component, electrolyte component, non-electrolytic, acidifying component and optional binder can be compounded into masterbatch concentrate pellets, which can be further let down into packaging resins for further processing into extruded film or sheet, or injection molded articles such as tubs, bottles, cups, trays and the like.

The degree of mixing of oxidizable metal, electrolyte and non-electrolytic, acidifying components and, if used, optional binder component may affect oxygen absorption performance of the oxygen-scavenging mixtures, with better mixing leading to better performance. Mixing effects may be most noticeable at low electrolyte plus non-electrolytic, acidifying components to oxidizable metal component ratios and at very low and very high non-electrolytic, acidifying component to electrolyte component ratios. Below e.g. 10 parts by weight of electrolyte plus non-electrolytic, acidifying components per 100 parts by weight of metal component, or when the weight ratio of either the electrolyte or non-electrolytic, acidifying component to the other is less than about 10:90, the oxygen-scavenger components are preferably mixed by aqueous slurry mixing followed by oven drying and grinding into fine particles. Below these ratios, mixing by techniques suitable at higher ratios, such as by high-intensity powder mixing, as in a Henschel mixer or a Waring powder blender, or by lower intensity mixing techniques, as in a container on a roller or tumbler, may lead to variability in oxygen uptake, particularly when the mixtures are incorporated into thermoplastic resins and used in melt processing operations.

Other factors that may affect oxygen absorption performance of the invented oxygen-scavenging mixtures include surface area of articles incorporating the compositions, with greater surface area normally providing better oxygen absorption performance. The amount of residual moisture in the water-absorbant binder, if used, also can affect performance with more moisture in the binder leading to better oxygen absorption performance. However, there are practical limits on the amount of moisture that should be present in the binder because too much can cause premature activation of the oxygen-scavenger mixture as well as processing difficulties and poor aesthetics in fabricated products. When incorporated into thermoplastic resins and used for fabrication of articles by melt processing techniques, the nature of the resin also can have a significant effect. Thus, when the invented oxygen-scavenging mixtures are used with amorphous and/or oxygen permeable polymers such as polyolefins or amorphous polyethylene terephthalate, higher oxygen absorption is seen than when the compositions are used with crystalline and/or oxygen barrier polymers such as crystalline polyethylene terephthalate and EVOH.

When used with thermoplastic resins, the oxygen-scavenging mixtures can be incorporated directly into the resin in amounts effective to provide the desired level of oxygen-scavenging ability. When so-used, preferred oxygen scavenger levels will vary depending on the choice of resin, configuration of the article to be fabricated from the resin and oxygen-scavenging capability needed in the article. Use of resins with low inherent viscosity, e.g., low molecular weight resins, normally permits higher loadings of scavenger composition without loss of processability. Conversely, lesser amounts of oxygen-scavenger mixture may facilitate use of polymeric materials having higher viscosities. Preferably, at least 0.1 parts by weight of oxygen-scavenging mixture are used per 100 parts by of weight of resin. Loading levels above 200 parts per 100 parts of resin generally do not lead to gains in oxygen absorption and may interfere with processing and adversely affect other product properties. More preferably, loading levels of e.g. 0.2 to 150 parts, in particular 0.3 to 50 parts or 5 to 50 parts, per 100 parts of resin are used to obtain good scavenging performance while maintaining processibility. Loading levels of 0.3 to 20 parts per 100 parts of resin are particularly preferred for fabrication of thin films and sheets.

Preferred oxygen-scavenger resin compositions for fabrication of packaging articles comprise at least one thermoplastic resin and e.g. 2 to 50 parts or 5 to 50 parts by weight of oxygen-scavenging mixture per 100 parts by weight of resin, with the oxygen-scavenging mixture comprising iron powder as component (I), KCl or $CaCl_2$ as component (II) and $Na_2H_2P_2O_7$ or $CaH_2P_2O_7$ as component (IIIa) optionally in combination with $NaH_2PO_4$, $KH_2PO_4$ or $Ca(H_2PO_4)_2$ as component (IIIb). More preferably, e.g. 30 to 130 parts by weight of component (II) plus component (III) (=component (IIIa) plus optionally component (IIIb)) per 10 parts by weight of iron are present in the scavenging mixture and the weight ratio of component (II) to component (III) is e.g. 10:90 to 90:10. Up to e.g. 50 parts by weight of water-absorbant binder per 100 parts by weight of resin and oxygen-scavenger also can be included. Especially preferred compositions of this type comprise polypropylene, high, low or linear low density polyethylene or polyethylene terephthalate as the resin, e.g. 5 to 30 parts by weight of oxygen-scavenger per 100 parts by weight of resin. Preferred is e.g. 5 to 100 parts by weight of component (II) and 5 to 70 parts by weight of component (III) per 10 parts by weight of iron and e.g. 0 to 50 parts by weight of binder per 100 parts by weight of components (I), (II) and (III).

While the oxygen-scavenging mixture and resin can be used in a non-concentrated form for direct fabrication of scavenging sheets or films (i.e., without further resin dilution), it also is beneficial to use the oxygen-scavenging composition and resin in the form of a concentrate or masterbatch. When so-used, the ability to produce a concentrate with low materials cost weighs in favor of relatively high loadings of scavenger that will still permit successful melt compounding, such as by extrusion pelletization. Thus, concentrate compositions according to the invention preferably contain at least e.g. 10 parts by weight of oxygen-scavenging mixture per 100 parts by weight of resin and more preferably 30 to 150 parts per 100 parts of resin. Suitable resins for such oxygen-scavenging concentrate compositions include any of the thermoplastic polymer resins described herein. Low melt viscosity resins facilitate use of high scavenger loadings and typically are used in small enough amounts in melt fabrication of finished articles that the typically lower molecular weight of the concentrate resin does not adversely affect final product properties. Preferred carrier resins are polypropylene, high density, low density and linear low density polyethylenes and polyethylene terephthalate. Preferred among those are polypropylenes having melt flow rates of e.g. 1 to 40 g/10 min, polyethylenes having melt indices of e.g. 1 to 20 g/10 min and polyethylene terephthalates having inherent viscosities of e.g. 0.6 to e.g. 1 in phenol/trichloroethane.

It is also contemplated to utilize various components of the oxygen-scavenging mixture or combinations of such components to form two or more concentrates that can be combined with a thermoplastic resin and fabricated into an oxygen-scavenging product. An advantage of using two or more concentrates is that the electrolyte and non-electrolytic, acidifying components can be isolated from the oxidizable metal until preparation of finished articles, thereby preserving full or essentially full oxygen-scavenging capability until actual use and permitting lower scavenger loadings than would otherwise be required. In addition, separate concentrates permit more facile preparation of differing concentrations of the electrolyte and non-electrolytic, acidifying components and/or water absorbant binder with the oxidizable metal and also enable fabricators to conveniently formulate a wide range of melt-processible resin compositions in which oxygen-scavenging ability can be tailored to specific end use requirements. Preferred components or combinations of components for use in separate concentrates are (a) acidifying component; (b) combinations of oxidizable metal component with water absorbing binder component; and (c) combinations of electrolyte and non-electrolytic acidifying components.

A particularly preferred component concentrate is a composition comprising $Na_2H_2P_2O_7$ or $CaH_2P_2O_7$ and a thermoplastic resin. Such a concentrate can be added in desired amounts in melt fabrication operations utilizing thermoplastic resin that already contains, or to which will be added, other scavenging components, such as a oxidizable metal or combination thereof with an electrolyte, to provide enhanced oxygen-scavenging capability. Especially preferred are concentrates containing e.g. 10 to e.g. 150 parts by weight of component (III) per 100 parts by weight of resin, with polypropylene, polyethylenes and polyethylene terephthalate being most preferred resins.

Thus, a further embodiment of the present invention is a masterbatch comprising
(A) a polymeric resin, and
(B) 30 to 150% by weight, based on the polymeric resin, of the oxygen-scavenging mixture as described herein.

Polymeric resins that can be used for incorporating the oxygen-scavenging mixtures into internal coatings of cans via spray coating and the like are typically thermoset resins such as epoxy, oleoresin, unsaturated polyester resins or phenolic based materials.

Another embodiment of the present invention is an article containing a composition as described above. The article may be a film, a laminate (e.g. a coextruded multilayer fim), a sheet or a rigid or flexible package (e.g. a food packaging).

In more detail, these articles of manufacture comprise at least one melt-fabricated layer containing the oxygen-scavenging mixture as described above. Because of the improved oxidation efficiency afforded by the invented oxygen-scavenging mixtures, the scavenger-containing layer can contain relatively low levels of the scavenger. The articles of the present invention are well suited for use in flexible or rigid packaging structures. In the case of rigid sheet packaging according to the invention, the thickness of the oxygen-scavenging layer is preferably not greater than e.g. 2500 µm, and is most preferably in the range of 50 to 1300 µm. In the case of flexible film packaging according to the invention, the thickness of the oxygen scavenger layer is preferably not greater than e.g. 250 µm and, most preferably, 10 to 200 µm. Packaging structures according to the invention can be in the form of films or sheets, both rigid and flexible, as well as container or vessel walls and liners as in trays, cups, bowls, bottles, bags, pouches, boxes, films, cap liners, can coatings and other packaging constructions. Both monolayer and multilayer structures are contemplated.

The oxygen-scavenging mixture and resin of the present invention afford active-barrier properties in articles fabricated therefrom and can be melt processed by any suitable fabrication technique into packaging walls and articles having excellent oxygen barrier properties that can avoid to include layers of costly gas barrier films such as those based on EVOH, PVDC, metallized polyolefin or polyester, aluminum foil, silica coated polyolefin and polyester, etc. The oxygen-scavenger articles of the present invention also provide the additional benefit of improved recyclability. Scrap or reclaim from the oxygen-scavenging resin can be easily recycled back into plastic products without adverse effects. In contrast, recycle of EVOH or PVDC gas barrier films may cause deterioration in product quality due to polymer phase separation and gelation occurring between the gas barrier resin and other resins making up the product. Nevertheless, it also is contemplated to provide articles, particularly for packaging applications, with both active and passive oxygen barrier properties through use of one or more passive gas barrier layers in articles containing one or more active barrier layers according to the invention. Thus, for some applications, such as packaging for food for institutional use and others calling for long shelf-life, an oxygen-scavenging layer according to the present invention can be used in conjunction with a passive gas barrier layer or film such as those based on EVOH, PVDC, metallized polyolefins or aluminum foil.

The present invention is also preferably directed to a packaging wall containing at least one layer comprising the oxygen-scavenging mixture and resin described above. It should be understood that any packaging article or structure intended to completely enclose a product will be deemed to have a "packaging wall," as that term is used herein, if the packaging article comprises a wall, or portion thereof, that is, or is intended to be, interposed between a packaged product and the atmosphere outside of the package and such wall or portion thereof comprises at least one layer incorporating the oxygen-scavenging mixture of the present invention. Thus, bowls, bags, liners, trays, cups, cartons, pouches, boxes, bottles and other vessels or containers which are intended to be sealed after being filled with a given product are covered by the term "packaging wall" if the oxygen-scavenging composition of the invention is present in any wall of such vessel (or portion of such wall) which is interposed between the packaged product and the outside environment when the vessel is closed or sealed. One example is where the oxygen-scavenging composition of the invention is fabricated into, or between, one or more continuous thermoplastic layers enclosing or substantially enclosing a product. Another example of a packaging wall according to the invention is a monolayer or multilayer film containing the present oxygen-scavenging mixture used as a cap liner in a beverage bottle (i.e., for beer, wine, fruit juices, etc.) or as a wrapping material.

An attractive active-barrier layer is generally understood as one in which the kinetics of the oxidation reaction are fast enough, and the layer is thick enough, that most of the oxygen permeating into the layer reacts without allowing a substantial amount of the oxygen to transmit through the layer. Moreover, it is important that this "steady state" condition exist for a period of time appropriate to end use requirements before the scavenger layer is spent. The present invention affords this steady state, plus excellent scavenger longevity, in economically attractive layer thicknesses, for example, less than e.g. 2500 μm in the case of sheets for rigid packaging, and less than e.g. 250 μm in the case of flexible films. For rigid sheet packaging according to the present invention, an attractive scavenger layer can be provided in the range of 250 to 750 μm, while for flexible film packaging, layer thicknesses of 20 to 200 μm are attractive. Such layers can function efficiently with as little as e.g. 2 to 10 weight % of oxygen-scavenger mixture based on weight of the scavenger layer.

In fabrication of packaging structures according to the invention, it is important to note that the oxygen-scavenging resin composition of the invention is substantially inactive with respect to chemical reaction with oxygen so long as the water activity of the composition is not sufficient. In contrast, the composition becomes active for scavenging oxygen when the water activity reaches a particularly level. Water activity is such that, prior to use, the invented packaging articles can remain substantially inactive in relatively dry environments without special steps to maintain low moisture levels. However, once the packaging is placed into use, most products will have sufficient moisture to activate the scavenger composition incorporated in the walls of the packaging article.

To prepare a packaging wall according to the invention, an oxygen-scavenging resin formulation is used or the oxygen-scavenging mixture, or its components or concentrates thereof, is compounded into or otherwise combined with a suitable packaging resin whereupon the resulting resin formulation is fabricated into sheets, films or other shaped structures. Extrusion, coextrusion, blow molding, injection molding and any other sheet, film or general polymeric melt-fabrication technique can be used. Sheets and films obtained from the oxygen-scavenger composition can be further processed, e.g. by coating or lamination, to form multilayered sheets or films, and then shaped, such as by thermoforming or other forming operations, into desired packaging walls in which at least one layer contains the oxygen scavenger. Such packaging walls can be subjected to further processing or shaping, if desired or necessary, to obtain a variety of active-barrier end-use packaging articles. The present invention reduces the cost of such barrier articles in comparison to conventional articles which afford barrier properties using passive barrier films.

As a preferred article of manufacture, the invention provides a packaging article comprising a wall, or combination of interconnected walls, in which the wall or combination of walls defines an enclosable product-receiving space, and wherein the wall or combination of walls comprises at least one wall section comprising an oxygen-scavenging layer comprising (i) a polymeric resin, preferably a thermoplastic resin or a thermoset resin and most preferably a thermoplastic resin selected from the group consisting of polyolefins, polystyrenes and polyesters; (ii) an oxidizable metal preferably comprising at least one member selected from the group consisting of Al, Mg, Zn, Cu, Fe, Sn, Co or Mn, and most preferably 0.1 to 100 parts of iron per 100 parts by weight of the resin; (iii) an electrolyte component and a solid, non-electrolytic, acidifying component which in the presence of water has a pH of less than 7, with e.g. 5 to about 150 parts by weight of such components per 10 parts by weight of iron preferably being present and the weight ratio of the non-electrolytic, acidifying component to electrolyte component preferably being about 5/95 to about 95/5; and, optionally, a water-absorbent binder.

A particularly attractive packaging construction according to the invention is a packaging wall comprising a plurality of thermoplastic layers adhered to one another in bonded laminar contact wherein at least one oxygen-scavenging layer is adhered to one or more other layers which may or may not include an oxygen-scavenging composition. It is particularly preferred, although not required, that the thermoplastic resin constituting the major component of each of the layers of the packaging wall be the same, so as to achieve a "pseudo-monolayer". Such a construction is easily recyclable.

An example of a packaging article using the packaging wall described above is a two-layer or three-layer dual ovenable tray made of crystalline polyethylene terephthalate ("C-PET") suitable for packaging pre-cooked single-serving meals. In a three-layer construction, an oxygen-scavenging layer of 250 to 500 μm thickness is sandwiched between two non-scavenging C-PET layers of 70 to 250 μm thickness. The resulting tray is considered a "pseudo-monolayer" because, for practical purposes of recycling, the tray contains a single thermoplastic resin, i.e., C-PET. Scrap from this pseudo-monolayer tray can be easily recycled because the scavenger in the center layer does not detract from recyclability. In the C-PET tray, the outer, non-scavenging layer provides additional protection against oxygen transmission by slowing down the oxygen so that it reaches the center layer at a sufficiently slow rate that most of the ingressing oxygen can be absorbed by the center layer without permeating through it. The optional inner non-scavenging layer acts as an additional barrier to oxygen, but at the same time is permeable enough that oxygen inside the tray may pass into the central scavenging layer. It is not necessary to use a three layer construction. For example, in the above construction, the inner C-PET layer can be eliminated. A tray formed from a single oxygen scavenging layer is also an attractive construction.

The pseudo-monolayer concept can be used with a wide range of polymeric packaging materials to achieve the same recycling benefit observed in the case of the pseudo-monolayer C-PET tray. For example, a package fabricated from polypropylene or polyethylene can be prepared from a multilayer packaging wall (e.g., film) containing the oxygen-scavenging composition of the present invention. In a two-layer construction the scavenger layer can be an interior layer with a non-scavenging layer of polymer on the outside to provide additional barrier properties. A sandwich construction is also possible in which a layer of scavenger-containing resin, such as polyethylene, is sandwiched between two layers of non-scavenging polyethylene. Alternatively, polypropylene, polystyrene or another suitable resin can be used for all of the layers.

Various modes of recycle may be used in the fabrication of packaging sheets and films according to the invention. For example, in the case of manufacturing a multilayer sheet or film having a scavenging and non-scavenging layer, reclaim scrap from the entire multilayer sheet can be recycled back into the oxygen scavenging layer of the sheet or film. It is also possible to recycle the multilayer sheet back into all of the layers of the sheet.

Packaging walls and packaging articles according to the present invention may contain one or more layers which are foamed. Any suitable polymeric foaming technique, such as bead foaming or extrusion foaming, can be utilized. For example, a packaging article can be obtained in which a foamed resinous layer comprising, for example, foamed polystyrene, foamed polyester, foamed polypropylene, foamed polyethylene or mixtures thereof, can be adhered to a solid resinous layer containing the oxygen-scavenging composition of the present invention. Alternatively, the foamed layer may contain the oxygen-scavenging composition, or both the foamed and the non-foamed layer can contain the scavenging composition. Thicknesses of such foamed layers normally are dictated more by mechanical property requirements, e.g. rigidity and impact strenth, of the foam layer than by oxygen-scavenging requirements.

Packaging constructions such as those described above can benefit from the ability to eliminate costly passive barrier films. Nevertheless, if extremely long shelf life or added oxygen protection is required or desired, a packaging wall according to the invention can be fabricated to include one or more layers of EVOH, nylon or PVDC, or even of metallized polyolefin, metallized polyester, or aluminum foil. Another type of passive layer which may be enhanced by an oxygen-scavenging resin layer according to the present invention is silica-coated polyester or silica-coated polyolefin. In cases where a multilayer packaging wall according to the invention contains layers of different polymeric compositions, it may be preferable to use adhesive layers such as those based on ethylene-vinyl acetate copolymer or maleated polyethylene or polypropylene, and if desired, the oxygen-scavenger of the present invention can be incorporated in such adhesive layers. It is also possible to prepare the oxygen-scavenging composition of the present invention using a gas barrier resin such as EVOH, nylon or PVDC polymer in order to obtain a film having both active and passive barrier properties.

While the focus of one embodiment of the invention is upon the incorporation of the oxygen-scavenging mixture directly into the wall of a container, the oxygen-scavenging mixtures also can be used in packets, as a separate inclusion within a packaging article where the intent is only to absorb headspace oxygen.

A primary application for the oxygen-scavenging resin, packaging walls, and packaging articles of the invention is in the packaging of perishable foods. For example, packaging articles utilizing the invention can be used to package milk, yogurt, ice cream, cheeses; stews and soups; meat products such as hot dogs, cold cuts, chicken, beef jerky; single-serving pre-cooked meals and side dishes; homemade pasta and spaghetti sauce; condiments such as barbecue sauce, ketchup, mustard, and mayonnaise; beverages such as fruit juice, wine, and beer; dried fruits and vegetables; breakfast cereals; baked goods such as bread, crackers, pastries, cookies, and muffins; snack foods such as candy, potato chips, cheese-filled snacks; peanut butter or peanut butter and jelly combinations, jams, and jellies; dried or fresh seasonings; and pet and animal foods; etc. The foregoing is not intended to be limiting with respect to the possible applications of the invention. Generally speaking, the invention can be used to enhance the barrier properties in packaging materials intended for any type of product which may degrade in the presence of oxygen.

Still other applications for the oxygen-scavenging compositions of this invention include the internal coating of metal cans, especially for oxygen-sensitive food items such as tomato-based materials, baby food and the like. Typically the oxygen-scavenging composition can be combined with polymeric resins such as thermosets of epoxy, oleoresin, unsaturated polyester resins or phenolic based materials and the material applied to the metal can by methods such as roller coating or spray coating.

Thus, a further embodiment of the invention is the use of a mixture comprising components (I) to (III) as defined above as oxygen-scavenger in food packaging.

An overview of the various applications which are possible for the present oxygen-scavenging mixtures are described for example in U.S. Pat, Nos. 5,744,056, 5,885,481, 6,369,148 and 6,586,514, which are incorporated by reference herein.

The examples below illustrate the invention in greater detail. All percentages and parts are by weight, unless stated otherwise.

EXAMPLE 1

$CaCl_2$, $CaH_2P_2O_7$ and $Ca(H_2PO_4)_2$ are mixed with low density polyethylene (LDPE; Dowlex®640 I) so that the weight ratio of $CaCl_2/CaH_2P_2O_7/Ca(H_2PO_4)_2$ is 1/0.92/0.08 and the final concentration of $CaCl_2$ is 1.25%, relative to the weight of the LDPE. 2.5%, relative to the weight of the LDPE, of common electrolytic iron powder (<44 µm) are added. The composition is mixed with an OMC®pilot double screw extruder (model EBV 19/25; 19 mm screw diameter and 1:25 ratio). 50 micron thick films are prepared using a Formac®Blow Extruder (model Lab25; 22 mm screw diameter and 1:25 ratio).

EXAMPLE 2

KCl, $Na_2H_2P_2O_7$ and $KH_2PO_4$ are mixed with low density polyethylene (LDPE; Dowlex®640 I) so that the weight ratio of $KCl/Na_2H_2P_2O_7/KH_2PO_4$ is 1/0.92/0.08 and the final concentration of the KCl 1.25%, relative to the weight of the LDPE. 2.5%, relative to the weight of the LDPE, of common electrolytic iron powder (<44 µm) are added. The composition is mixed with an OMC®pilot double screw extruder (model EBV 19/2; 19 mm screw diameter and 1:25 ratio). 50 micron thick films are prepared using a Formac®Blow Extruder (model Lab25; 22 mm screw diameter and 1:25 ratio).

EXAMPLE 3

KCl, $CaH_2P_2O_7$ and $KH_2PO_4$ are mixed with low density polyethylene (LDPE; Dowlex®640 I) so that the weight ratio of $KCl/CaH_2P_2O_7/KH_2PO_4$ is 1/0.92/0.08 and the final concentration of KCl is 1.25%, relative to the weight of the LDPE. 2.5%, relative to the weight of the LDPE, of common electrolytic iron powder (<44 µm) are added. The composition is mixed with an OMC®pilot double screw extruder (model EBV 19/25; 19 mm screw diameter and 1:25 ratio). 50 micron thick films are prepared using a Formac®Blow Extruder (model Lab25; 22 mm screw diameter and 1:25 ratio).

EXAMPLE 4

KCl, $Na_2H_2P_2O_7$ and $NaH_2PO_4$ are mixed with low density polyethylene (LDPE; Dowlex®640 I) so that the weight ratio of $KCl/Na_2H_2P_2O_7/NaH_2PO_4$ is 1/0.92/0.08 and the final concentration of KCl is 2.5%, relative to the weight of the LDPE. 5.0%, relative to the weight of the LDPE, of common electrolytic iron powder (<44 µm) are added. The composition is mixed with an OMC®pilot double screw extruder (model EBV 19/25; 19 mm screw diameter and 1:25 ratio). 50 micron thick films are prepared using a Formac®Blow Extruder (model Lab25; 22 mm screw diameter and 1:25 ratio).

EXAMPLE 5

$CaCl_2$, $Na_2H_2P_2O_7$ and $NaH_2PO_4$ are mixed with low density polyethylene (LDPE; Dowlex®640 I) so that the weight ratio of $CaCl_2/Na_2H_2P_2O_7/NaH_2PO_4$ is 1/0.92/0.08 and the final concentration of $CaCl_2$ is 2.5%, relative to the weight of the LDPE. 5.0%, relative to the weight of the LDPE, of common electrolytic iron powder (<44 μm) are added. The composition is mixed with an OMC®pilot double screw extruder (model EBV 19/25; 19 mm screw diameter and 1:25 ratio). 50 micron thick films are prepared using a Formac®Blow Extruder (model Lab25; 22 mm screw diameter and 1:25 ratio).

EXAMPLE 6

KCl, $Na_2H_2P_2O_7$ and $NaH_2PO_4$ are mixed with low density polyethylene (LDPE; Dowlex®640 I) so that the ratio of $KCl/Na_2H_2P_2O_7/NaH_2PO_4$ is 1/0.92/0.08 by weight, an final concentration of KCl is 1.25%, relative to the weight of the LDPE. 2.5%, relative to the weight of the LDPE, of common electrolytic iron powder (<44 μm) are added. The composition is mixed with an OMC®pilot double screw extruder (model EBV 19/25, 19 mm screw diameter and 1:25 ratio). 50 micron-thick films are prepared using a Formac®Blow Extruder (model Lab25, with a 22 mm screw diameter and 1:25 ratio).

EXAMPLE 7

$CaCl_2$, $Na_2H_2P_2O_7$ and $NaH_2PO_4$ are mixed with low density polyethylene (LDPE; Dowlex®640 I) so that the ratio of $CaCl_2/Na_2H_2P_2O_7/NaH_2PO_4$ is 1/0.92/0.08 by weight, and the final concentration of $CaCl_2$ is 1.25%, relative to the weight of the LDPE. 2.5%, relative to the weight of the LDPE, of common electrolytic iron powder (<44 μm) are added. The composition is mixed with an OMC®pilot double screw extruder (model EBV 19/25, 19 mm screw diameter and 1:25 ratio). 50 micron-thick films are prepared using a Formac®Blow Extruder (model Lab25, with a 22 mm screw diameter and 1:25 ratio).

EXAMPLE A

Several aliquots of the films according to EXAMPLES 1 to 5 are exposed to air (20.7% $O_2$) in 500 ml sealed flasks provided with a septum that allows portions of the inside atmosphere to be drawn for analysis at several intervals using a syringe, in the presence of 15 ml water contained in a vial inside the flasks. Oxygen concentration measures are carried out using a Mocon®Pac Check 450 head space analyzer over 28 days. The actual iron concentrations in the samples tested are finally measured by ICP-OES (Inductively Coupled Plasma—Optical Emission Spectrometer; Perkin Elmer®Optima Series 4200DV). The results in terms of ml $O_2$/g Fe are given in Table 1.

TABLE 1

Average oxygen scavenger activity (ml $O_2$/g Fe) of LDPE films measured after 28 days.

| | Average ml $O_2$/g Fe *) after 28 days |
|---|---|
| EXAMPLE 1 | 123 |
| EXAMPLE 2 | 122 |
| EXAMPLE 3 | 77 |
| EXAMPLE 4 | 149 |
| EXAMPLE 5 | 98 |
| EXAMPLE 6 | 117 |
| EXAMPLE 7 | 99 |

*) High values are desired.

The amount of oxygen adsorbed by the test samples is determined from the change in the oxygen concentration in the head space of a sealed glass container. The test container has a headspace volume of about 500 ml and contains atmospheric air so that about 100 ml of oxygen are available for reaction with the iron particles.

Detailed description of Oxygen uptake Method:

Film thickness is measured and 4.00 g of film (±0.01 g) are weighted. The extruded film is folded and placed in a clean 500 ml sealed glass container. A vial containing 15 ml of deionized water is added to produce 100% relative humidity inside the glass container.

The oxygen content in the ambient air on day 0 (i.e. equal to the initial oxygen content in the sealed glass container) is tested and recorded using a Mocon Oxygen Analyzer.

The glass containers with test films and water vials are stored at 22° C. (generally, room temperature) for 28 days.

The oxygen content in the sealed glass containers using a Mocon Oxygen Analyzer on day 28 are tested and recorded.

Based on the measured oxygen concentration remaining in the sealed glass container, the volume of oxygen absorbed per gram of Oxygen Scavenger is calculated using the following formula.

$$\text{Oxygen absorbed (cc/g)} = \{(\% O_2)_i - (\% O_2)_f\} * 0.01 * V_f / (W_F * W_S / W_B)$$

where:

$(\% O_2)_i$ Initial oxygen concentration in the sealed glass container (%)

$(\% O_2)_f$ Oxygen concentration in the sealed glass container at day of test (%)

0.01: Conversion factor $V_f$: Free air volume of the sealed glass container (cc) (total volume of the sealed glass container less space occupied by vial and film, typically 440 cc)

$W_F$: Weight of film placed into the glass container (g) (typically 4.0 g)

$W_S$: Weight of Oxygen Scavenger used to make blend (g)

$W_B$: Total weight of blend (g)

COMPARISON EXAMPLE

Oxygen scavenger mixture known from U.S. Pat. No. 5,744,056:

Fe, NaCl, $Na_2H_2P_2O_7$ plus $NaH_2PO_4$.

NaCl, $Na_2H_2P_2O_7$ and $NaH_2PO_4$ are mixed with low density polyethylene (Dowlex®640 I) so that the weight ratio of $NaCl/Na_2H_2P_2O_7/NaH_2PO_4$ is 1/0.92/0.08 and the final concentration of NaCl is 1.25%, relative to the weight of the LDPE. 2.5%, relative to the weight of the LDPE, of common electrolytic iron powder (<44 μm) are added. The composition is mixed with an OMC®pilot double screw extruder (model EBV 19/25; 19 mm screw diameter and 1:25 ratio). 50 micron thick films are prepared using a Formac®Blow Extruder (model Lab25; 22 mm screw diameter and 1:25 ratio). The films are tested as described in EXAMPLE A. The results are indicated in Table 2 together with the test results obtained for the films of present EXAMPLES 1 to 3, 6 and 7.

TABLE 2

Average oxygen scavenger activity (ml $O_2$/g Fe) of LDPE films measured after 28 days.

| | Average ml $O_2$/g Fe *) after 28 days |
|---|---|
| Oxygen scavenger mixture known from U.S. Pat. No. 5,744,056: | |
| Fe, NaCl, $Na_2H_2P_2O_7$ plus $NaH_2PO_4$ | 43 |
| Oxygen scavenger mixture according to the present invention: | |
| EXAMPLE 1: Fe, $CaCl_2$, $CaH_2P_2O_7$ plus $Ca(H_2PO_4)_2$ | 123 |
| EXAMPLE 2: Fe, KCl, $Na_2H_2P_2O_7$ plus $KH_2PO_4$ | 122 |
| EXAMPLE 3: Fe, KCl, $CaH_2P_2O_7$ plus $KH_2PO_4$ | 77 |
| EXAMPLE 6: Fe, KCl, $Na_2H_2P_2O_7$ plus $NaH_2PO_4$ | 117 |
| EXAMPLE 7: Fe, $CaCl_2$, $Na_2H_2P_2O_7$ plus $NaH_2PO_4$ | 99 |

*) High values are desired.

The invention claimed is:

1. An oxygen-scavenging mixture comprising
   (I) an oxidizable metal component,
   (II) an electrolyte component selected from the group consisting of KCl and $CaCl_2$,
   (IIIa) $Na_2H_2P_2O_7$ or $CaH_2P_2O_7$ and
   (IIIb) $NaH_2PO_4$, $KH_2PO_4$ or Ca $(H_2PO_4)_2$.

2. The oxygen-scavenging mixture according to claim 1 wherein the oxidizable metal is selected from the group consisting of Al, Mg, Zn, Cu, Fe, Sn, Co and Mn.

3. The oxygen-scavenging mixture according to claim 1 wherein the oxidizable metal is iron.

4. The oxygen-scavenging mixture according to claim 1 further comprising (IV) a water-absorbant binder.

5. A composition comprising
   (A) a polymeric resin, and
   (B) an oxygen-scavenging mixture according to claim 1 and optionally a further additive selected from the group consisting of
      (C-1) UV absorbers,
      (C-2) antioxidants and
      (C-3) further light stabilizers.

6. The composition according to claim 5 wherein the polymeric resin is an olefin homo- or copolymer, a polyamide homo or copolymer, a polyester with repeating units selected from the group consisting of therephthalic acid residues, isophtalic acid residues and naphthalenic acid residues or mixtures thereof.

7. An article containing a composition as defined in claim 5.

8. An article according to claim 7, which is a film, a sheet or a laminate.

9. An article according to claim 7 which is a coextruded multilayer film.

10. An article according to claim 7 which is a food packaging.

11. A masterbatch comprising
    (A) a polymeric resin, and
    (B) 30 to 150% by weight, based on the polymeric resin, of the oxygen-scavenging mixture according to claim 1.

12. A composition comprising
    (A) polyethylene and
    (B) an oxygen-scavenging mixture comprising
       (I) iron,
       (II) $CaCl_2$,
       (IIIa) $CaH_2P_2O_7$ and optionally
       (IIIb) $NaH_2PO_4$, $KH_2PO_4$ or $Ca(H_2PO_4)_2$.

13. The composition according to claim 12 where the oxygen-scavenging mixture comprises
    (I) iron,
    (II) $CaCl_2$,
    (IIIa) $CaH_2P_2O_7$ and
    (IIIb) $Ca(H_2PO_4)_2$.

14. An oxygen-scavenging mixture comprising
    (I) iron,
    (II) $CaCl_2$,
    (IIIa) $CaH_2P_2O_7$ and optionally
    (IIIb) $NaH_2PO_4$, $KH_2PO_4$ or $Ca(H_2PO_4)_2$.

15. The oxygen-scavenging mixture according to claim 14 comprising
    (I) iron,
    (II) $CaCl_2$,
    (IIIa) $CaH_2P_2O_7$ and
    (IIIb) $Ca(H_2PO_4)_2$.

16. The composition according to claim 6 where the polymeric resin is polyethylene and where the oxygen scavenging mixture comprises
    (I) iron,
    (II) KCl,
    (IIIa) $Na_2H_2P_2O_7$ and
    (IIIb) $NaH_2PO_4$, $KH_2PO_4$ or $Ca(H_2PO_4)_2$.

17. The composition according to claim 16 where the oxygen-scavenging mixture comprises
    (I) iron,
    (II) KCl,
    (IIIa) $Na_2H_2P_2O_7$ and
    (IIIb) $KH_2PO_4$.

18. The oxygen-scavenging mixture according to claim 1 comprising
    (I) iron,
    (II) KCl,
    (IIIa) $Na_2H_2P_2O_7$ and
    (IIIb) $NaH_2PO_4$, $KH_2PO_4$ or $Ca(H_2PO_4)_2$.

19. The oxygen-scavenging mixture according to claim 1 comprising
    (I) iron,
    (II) KCl,
    (IIIa) $Na_2H_2P_2O_7$ and
    (IIIb) $KH_2PO_4$.

* * * * *